Feb. 19, 1946.   A. R. JACKSON   2,395,275
COLLAPSIBLE CHILD'S CART
Filed Nov. 22, 1944   3 Sheets-Sheet 1
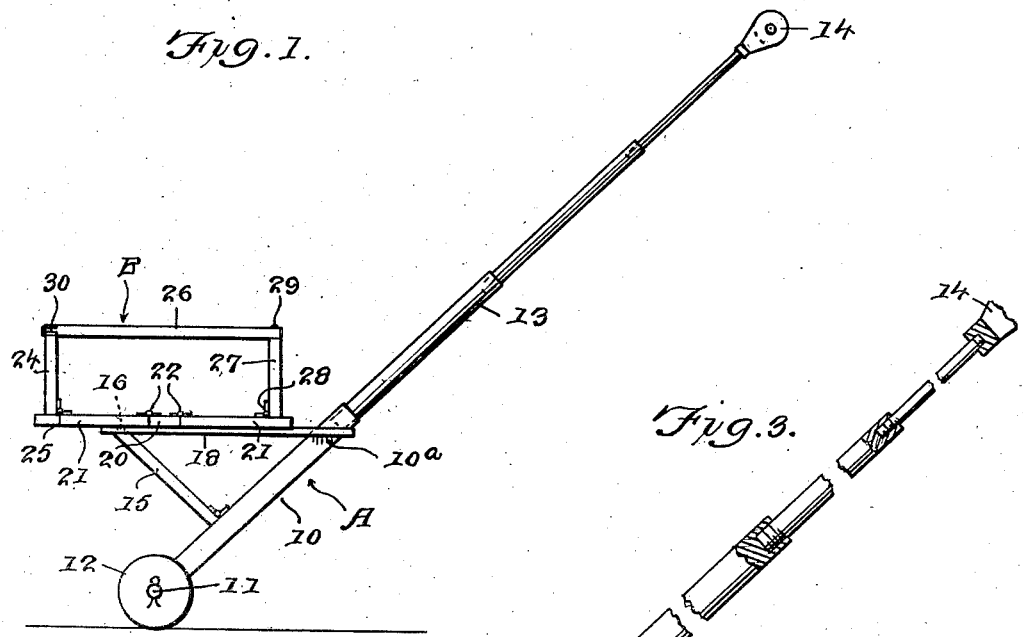
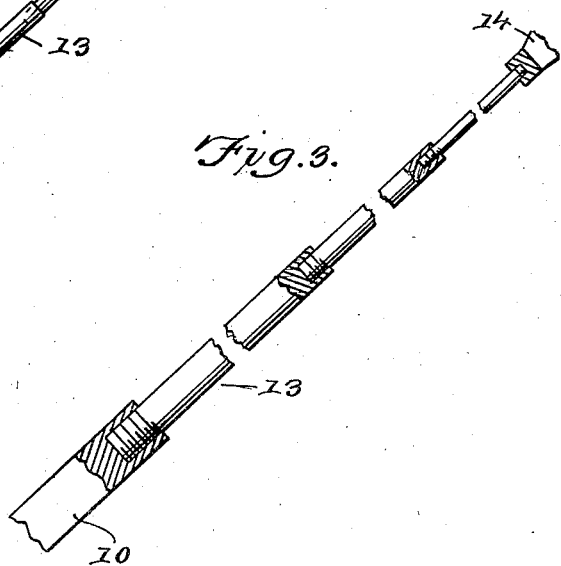
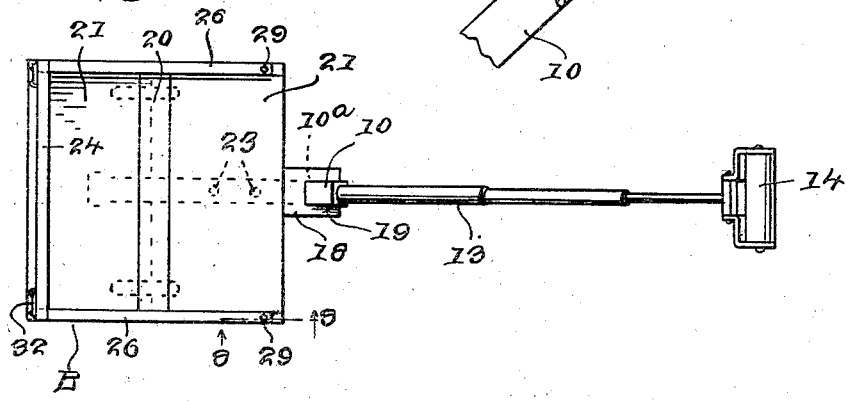
INVENTOR.
Arch R. Jackson
BY
Victor J. Evans & Co.
ATTORNEYS Feb. 19, 1946. A. R. JACKSON 2,395,275
COLLAPSIBLE CHILD'S CART
Filed Nov. 22, 1944 3 Sheets-Sheet 2
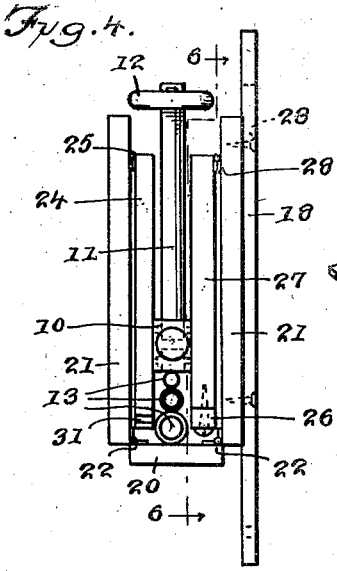
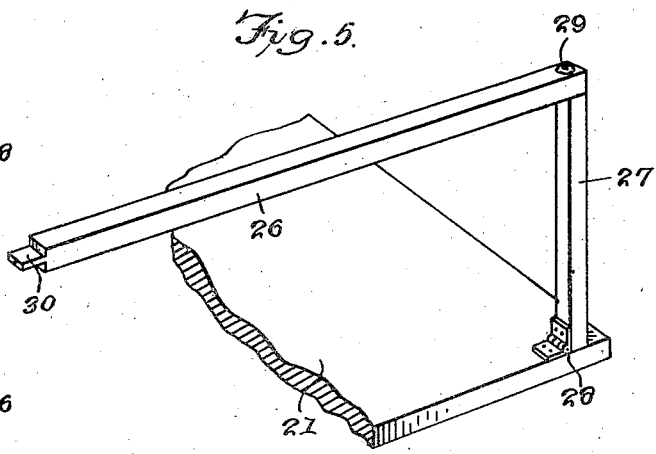
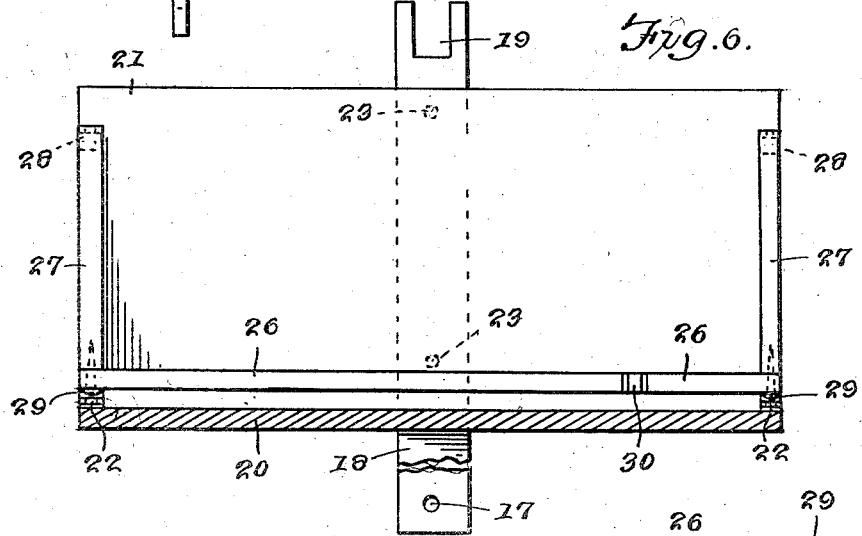
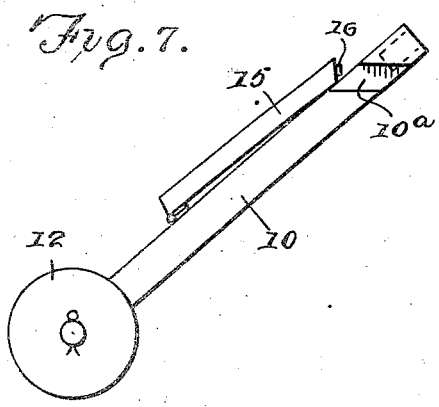
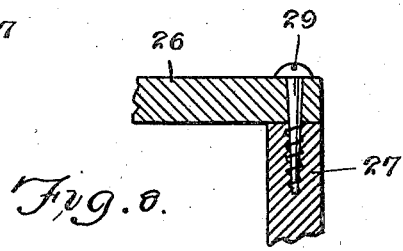
INVENTOR.
Arch R. Jackson
BY
Victor J. Evans & Co.
ATTORNEYS Feb. 19, 1946.  A. R. JACKSON  2,395,275
COLLAPSIBLE CHILD'S CART
Filed Nov. 22, 1944   3 Sheets-Sheet 3
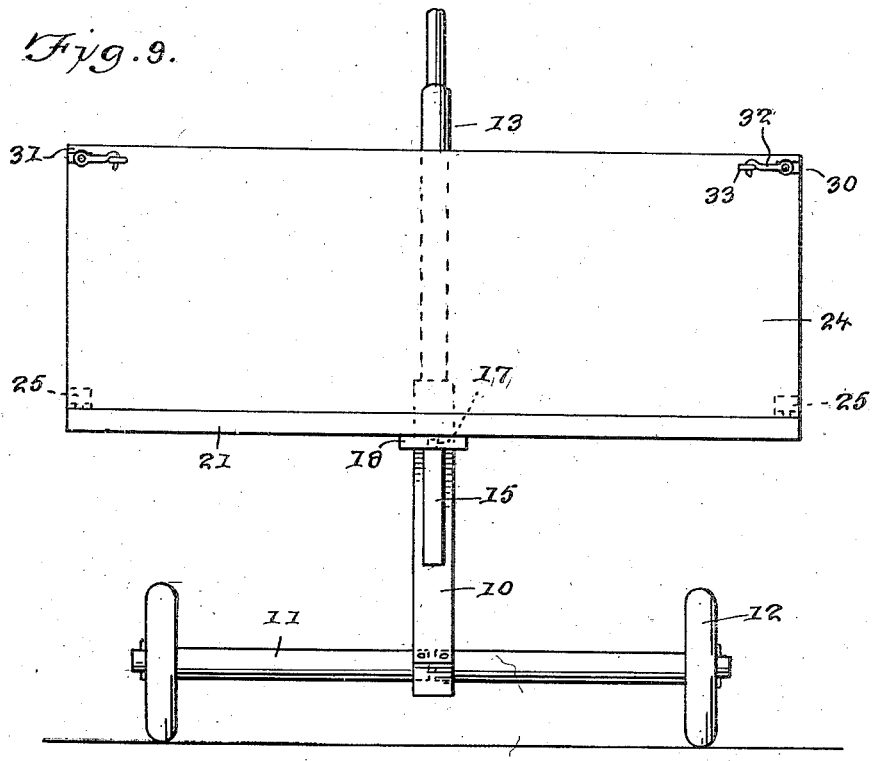
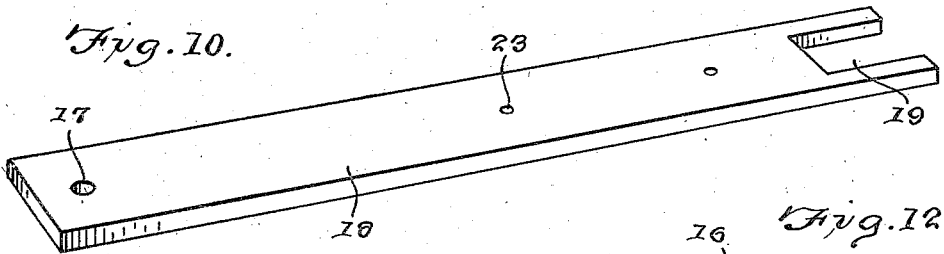
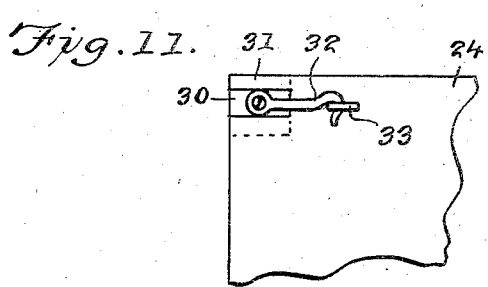
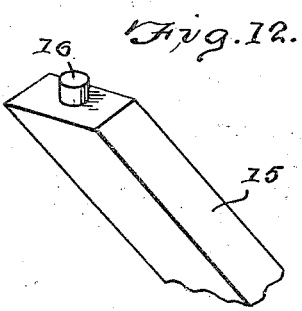
INVENTOR.
Arch R. Jackson
BY
Victor J. Evans & Co.
ATTORNEYS Patented Feb. 19, 1946

2,395,275

UNITED STATES PATENT OFFICE 2,395,275

COLLAPSIBLE CHILD'S CART

Arch Robert Jackson, Bridgeport, Conn.

Application November 22, 1944, Serial No. 564,581

3 Claims. (Cl. 280—36)

The invention relates to a foldable wheeled vehicle, and more especially to a collapsible cart for carrying a child while shopping.

The primary object of the invention is the provision of a cart of this character, wherein the construction thereof is such that it can be collapsed into compact form so that it can be conveniently handled and will occupy the least possible space while not in use or set-up for service, the cart being readily set-up for service with dispatch and ease.

Another object of the invention is the provision of a cart of this character, wherein it when set-up will afford a carrier for child or merchandise or the like, the cart being wheeled so that it can move freely when pushed or pulled with ease and eliminates undue labor in the handling thereof, especially when within a shopping locality or within a store or other enclosure.

A further object of the invention is the provision of a cart of this character, wherein the parts thereof are detachably and foldably joined together in a novel and unique manner, so that such cart can be erected or knocked-down with dispatch and ease.

A still further object of the invention is the provision of a cart of this character, which is simple in construction, thoroughly reliable and efficient for the purposes intended thereof, strong, durable, neat in appearance, easily manipulated, possessed of a minimum number of parts, which are collapsibly interfitted with each other, most convenient for shoppers, readily handled in congested places, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a side view of the cart constructed in accordance with the invention.

Figure 2 is a top plan view thereof.

Figure 3 is a fragmentary side view partly in section of the sectional handle bar of the cart.

Figure 4 is a side view of the carrier body of the cart folded.

Figure 5 is a fragmentary perspective view of a portion of the carrier body extended.

Figure 6 is a sectional view taken on the line 6—6 of Figure 4 looking in the direction of the arrows.

Figure 7 is a side view of the chassis frame of the cart.

Figure 8 is a fragmentary sectional view taken on the line 8—8 of Figure 2 looking in the direction of the arrows.

Figure 9 is a front elevation of the cart set up for use.

Figure 10 is a perspective view of the body supporting bed or rail.

Figure 11 is a fragmentary elevation of one of the corner portions of the carrier body.

Figure 12 is a fragmentary perspective view of the bed or rail brace.

Similar reference characters indicate corresponding parts throughout the several views in the drawings.

Referring to the drawings in detail A designates generally the cart constructed in accordance with the invention and in its entirety, which comprises a center beam 10 of the required length, preferably squared in cross-section, and is made from any suitable material, in this instance, wood stock, which is provided at its lowermost apertured end with a wheel axle 11 which is fixed in apertured end by any well known fastening means and the axle, protrudes the same distance to opposite sides thereof, and upon which are journaled ground rollers or wheels 12 of any selected type.

Tapped into the uppermost end of the beam 10 is a separable sectional handle bar 13, its sections being of any selected length and of varying cross-sectional sizes, while the outermost section of this bar 13 is fitted with a hand grip 14, preferably of yoke form.

On the beam 10 at the proper locality is a foldable hinged brace or prop 15 having a dowel free end 16 for detachably engaging in a socket or hole 17 in the outer end of a bed piece or supporting rail 18 for a carrier body denoted generally at B, and hereinafter set forth in detail. The inner end of the piece or rail 18 is formed with a saddling fork 19 for receiving the beam 10, as best seen in Figures 1 and 2 of the drawings, when the cart A is set up for use.

The carrier body B comprises a bottom area having the intermediate section 20 and outer foldable sections 21, respectively, these sections 21 being foldably connected by hinges 22 to the intermediate section 20, and one of the sections 21 is made secure at 23 to the piece or rail 18 next to the fork 19, while the other section 21 and the intermediate section 20 are swingable in the same plane with the said other section 21 onto the piece or rail 18 when the carrier body B is set up for use for carrying purposes, whence the piece or rail 18 is in a horizontal plane with the brace or prop 15 supporting it engaged on the beam 10, as best seen in Figure 1 of the drawings. The beam or bar 10 is notched, as at 10ª, to receive the forked end of the seat-supporting bar 18 and thus prevent the seat from accidentally swinging upwardly on its brace 15.

The seat B is provided with a back 24 which is hinged at its lower edge, as at 25, to the rear section 21 of the bottom of the seat. The seat B also has side rails 26 which are pivotally connected to uprights 27 and which are detachably connected to the back 24. The uprights 27 are hinged, as at 28, to the front section 21 of the bottom of the seat, and the connection between the side rails 26 and the uprights is established by screws 29. The side rails are connected to the back 24 by tongues 30 on the side rails fitting in recesses 31 in the back, and by hooks 32 pivoted to the tongues and engaging eyes 33 on the back. The front side of seat faces the handle bar and is fully open. The construction of the seat is such as to permit the seat to be compactly folded conveniently and in a short time. The seat may be readily unfolded and easily secured in condition for use. The manner in which the seat may be folded is clearly shown in Figure 4.

The cart A when to be used is set up as is clearly shown in Figures 1 and 2 of the drawings, then when the said cart is to be brought to a disused condition the parts are separated and folded for nesting thereof in a compact condition as best shown in Figure 4 of the drawings, which also permits it to be stored in the least possible space or for easy transportation thereof.

From the foregoing it is thought that the construction and manner of operation of the cart A will be clearly understood, and therefore a more extended explanation has been omitted for the sake of brevity.

What is claimed is:

1. A cart of the kind described, comprising a wheeled beam, a seat bottom comprising front and rear sections and an intermediate section hinged together, a rail to which one of said sections is fixed, the remaining sections of the seat being foldable with relation to the fixed section, and means for detachably mounting the rail on the beam.

2. A cart of the kind described, comprising a wheeled beam, a seat having front, rear and intermediate sections hinged together, a rail to which the front section is fixed, the rear and intermediate sections being foldable with relation to the front section, a back hinged to the rear section, uprights hinged to the front section, said rails hinged to the uprights and detachably connected to the back, and means removably supporting the rail on the beam.

3. The invention as in claim 2 wherein a separable sectional handle bar is connected to the beam and a yoke like band grip is detachably connected with the handle bar.

ARCH ROBERT JACKSON.